United States Patent
Sung et al.

(10) Patent No.: US 8,740,295 B2
(45) Date of Patent: Jun. 3, 2014

(54) APPARATUS FOR ADJUSTING PARING LINE OF PANORAMIC SUNROOF

(71) Applicants: Do Won Sung, Suwon-si (KR); Kuk Hyun Cho, Ansan-si (KR); Kyoung Taek Kwak, Yongin-si (KR)

(72) Inventors: Do Won Sung, Suwon-si (KR); Kuk Hyun Cho, Ansan-si (KR); Kyoung Taek Kwak, Yongin-si (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 13/712,690

(22) Filed: Dec. 12, 2012

(65) Prior Publication Data

US 2014/0028059 A1    Jan. 30, 2014

(30) Foreign Application Priority Data

Jul. 25, 2012    (KR) .......................... 10-2012-0080895

(51) Int. Cl.
   *B60J 7/057* (2006.01)
(52) U.S. Cl.
   USPC ...................................... 296/223; 296/216.08
(58) Field of Classification Search
   USPC ............................................. 296/216.01–224
   See application file for complete search history.

(56) References Cited

U.S. PATENT DOCUMENTS

| | | | |
|---|---|---|---|
| 7,182,400 B2 * | 2/2007 | Grimm et al. | 296/216.08 |
| 8,118,356 B2 * | 2/2012 | Holzel | 296/216.03 |
| 8,444,217 B2 * | 5/2013 | Nellen et al. | 296/223 |
| 2006/0080903 A1 * | 4/2006 | Grimm et al. | 52/64 |
| 2012/0068503 A1 | 3/2012 | Uehara et al. | |

FOREIGN PATENT DOCUMENTS

| | | | |
|---|---|---|---|
| DE | 4306451 | * | 3/1994 |
| DE | 10143823 | * | 3/2003 |
| JP | 2009-202627 A | | 9/2009 |
| KR | 2003-0041398 A | | 5/2003 |
| KR | 10-2007-0107771 A | | 11/2007 |
| KR | 1020100092571 A | | 8/2010 |

* cited by examiner

*Primary Examiner* — Dennis H Pedder
(74) *Attorney, Agent, or Firm* — Morgan, Lewis & Bockius LLP (57) ABSTRACT

An apparatus adjusts a parting line of a panoramic sunroof comprising a moving glass and a rail. The apparatus includes a fixing bracket, a moving bracket, and a slide structure. The fixing bracket is disposed on a side surface of a rear end of the moving glass to be tiltable and movable in a straight line. The moving bracket is disposed on a curved path of the rail to be movable along a curved trajectory. The slide structure is connected between the fixing bracket and the moving bracket to enable curved movement by allowing the moving bracket to spread from the fixing bracket when the fixing bracket moves in a straight line.

3 Claims, 8 Drawing Sheets

< A-A SECTIONAL VIEW >

- CLOSED STATE OF MOVING GLASS -

FIG.10

- OPENED STATE OF MOVING GLASS -

FIG.11

APPARATUS FOR ADJUSTING PARING LINE OF PANORAMIC SUNROOF

CROSS-REFERENCE TO RELATED APPLICATION

The present application claims priority of Korean Patent Application Number 10-2012-0080895 filed Jul. 25, 2012, the entire contents of which application is incorporated herein for all purposes by this reference.

BACKGROUND OF INVENTION

1. Field of Invention

The present invention relates to an apparatus for adjusting a paring line of a panoramic sunroof. More particularly, the present invention relates to an apparatus for controlling a parting line of a panoramic sunroof, which can improve the exterior merchantability by designing the glass parting line of the panoramic sunroof into a curved line.

2. Description of Related Art

Generally, panoramic sunroofs are openably/closably mounted on a roof panel and a head lining to ventilate the interior and provide the sense of openness. Recently, panoramic sunroofs manufactured with glass materials heat-treated so as to provide a larger sense of openness with respect to the outside and effectively block ultraviolet and infrared rays are drawing attention.

The panoramic sunroof is a large area sunroof that can open the rear interior space as well as the front interior space of a vehicle. The panoramic sunroof can provide a feeling of riding a convertible vehicle by maximizing the sense of openness.

The panoramic sunroof includes two- or three-piece type opening/closing glasses, and based on the opening/closing mechanism, tilts or slides to perform an open or close operation.

Hereinafter, the configuration and operation flow of a typical panoramic sunroof will be described with reference to the accompanying drawings.

Figure 9:
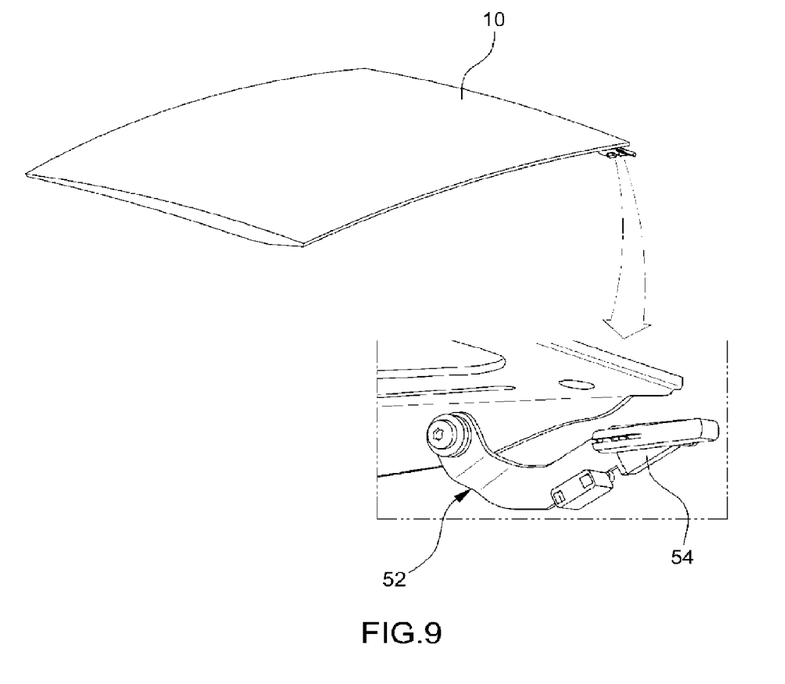
FIG. 9 is a schematic view illustrating a tilting lever mounting on a moving glass of a typical panoramic sunroof.
Figure 10:
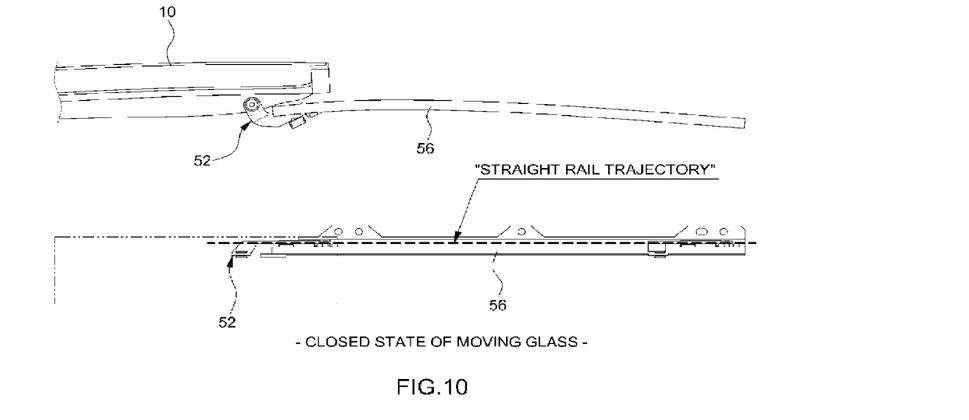
FIGS. 10 and 11 are side views and plan views illustrating an apparatus for adjusting a parting line of a panoramic sunroof, moving along a straight rail trajectory, which show the closed and opened states of a moving glass.
Figure 11:
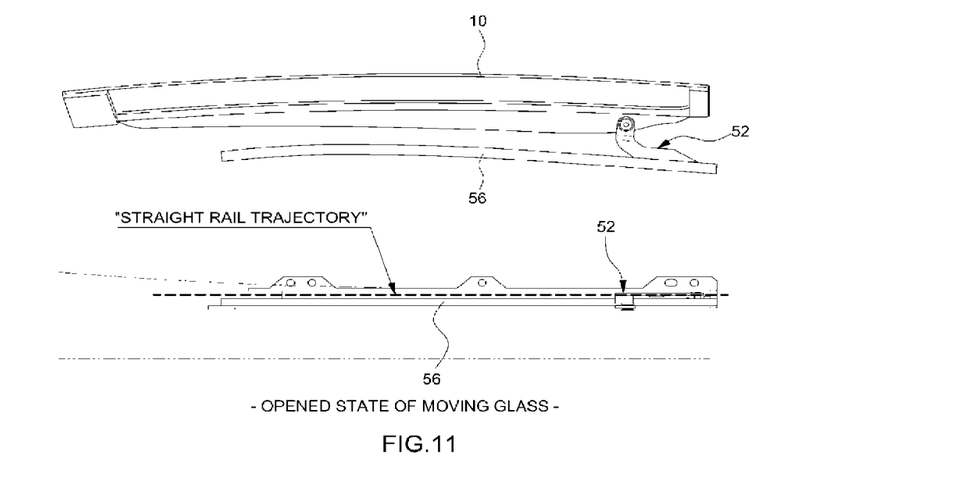

As shown in FIGS. 9 through 11, a panoramic sunroof includes a moving glass 10, a straight rail 56 along which the moving glass 10 moves forward and backward, a tilt lever 52 disposed at the rear end of the moving glass 10, and a rail slider 54 integrally extending from the lower end of the tilt lever 52 and slidably mounted on the straight rail 56.

The operation of the panoramic sunroof is divided into a tilting operation for lifting the moving glass 10 and a straight line movement operation for outsliding after the tilting.

The tilt lever 52 is one of mechanism parts for moving the moving glass 10. The rear part of the moving glass 10 is upwardly lifted through the tilting operation, and then the rail slider 54 performs a straight line motion in which the rail slider 54 slides backward along the straight rail 56. Thus, the moving glass 10 of the panoramic sunroof can be opened.

In this case, the straight rail 57 on which the rail slider 54 of the tilt lever 52 slides forms a straight line section along a T-direction (length direction of vehicle body) when viewed from the top.

Figure 8:
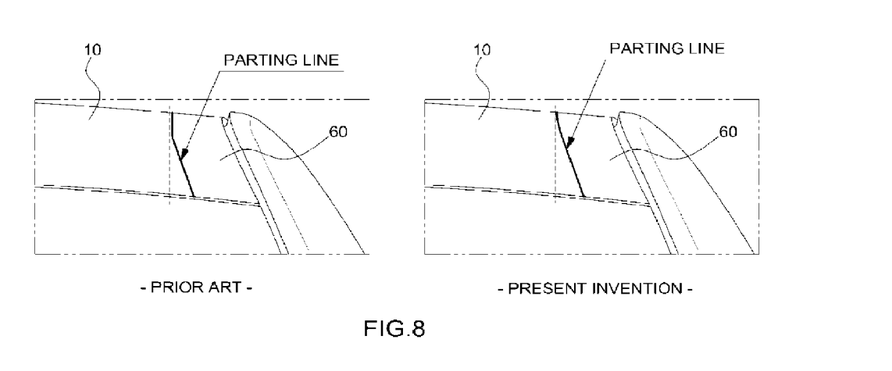
FIG. 8 is a view illustrating a comparison between a typical parting line and a parting line according to the present invention.

Accordingly, since the rail slider 54, including the tilt lever 52, moves in a straight line along the straight rail 56, as shown in the left drawing of FIG. 8, there exists a straight line section in the parting line between the moving glass 10 and the roof panel 60 when viewed from the outside.

Thus, when the parting line between the roof panel and the moving glass is not one curved line that smoothly extends, and there exists a straight line section in the parting line, the parting line looks unbalanced in external appearance as a whole, reducing the merchantability. As a result, the panoramic sunroof has a great limitation in the design of the parting line.

The information disclosed in this Background section is only for enhancement of understanding of the general background of the invention and should not be taken as an acknowledgement or any form of suggestion that this information forms the prior art already known to a person skilled in the art.

SUMMARY OF INVENTION

The present invention provides an apparatus for adjusting a paring line of a panoramic sunroof, which can increase the design flexibility on the glass parting line and thus improve the exterior merchantability because a glass parting line between a moving glass of the panoramic sunroof and a roof panel can be improved into one curved line without a straight line section, by forming a structure that can move along a curvature trajectory of a rear rail at a tilt lever connected between the moving glass and the rear rail.

Various aspects of the present invention provide for an apparatus for adjusting a parting line of a panoramic sunroof comprising a moving glass and a rail, the apparatus comprising: a fixing bracket disposed on a side surface of a rear end of the moving glass to be tiltable and movable in a straight line; a moving bracket disposed on a curved path of the rail to be movable along a curved trajectory; and a slide structure connected between the fixing bracket and the moving bracket to enable curved movement by allowing the moving bracket to spread from the fixing bracket when the fixing bracket moves in a straight line.

The slide structure may include: a fixing frame integrally formed on an outer surface of the fixing bracket; a slider disposed inside the fixing frame to be movable along a width direction of a vehicle body and having an insertion aperture at a center thereof; a first spring connected between an inner side surface of the slider and one inner surface of the fixing frame and a second spring connected between an outer side surface of the slider and the other inner surface of the fixing frame; an insertion member formed on an inner side surface of the moving bracket; and a guide rod integrally connected to upper and lower surfaces inside the insertion member. Here, the fixing frame is inserted into the insertion member of the moving bracket together with the slider, and simultaneously, the guide rod is inserted into the insertion aperture of the slider.

Upon open movement of the moving glass, the moving bracket may spread from the fixing bracket by an angle of the curved path of the rail.

Upper and lower ends of the guide rod may be rotatably disposed on the upper and lower surfaces using a hinge, respectively.

The methods and apparatuses of the present invention have other features and advantages which will be apparent from or are set forth in more detail in the accompanying drawings, which are incorporated herein, and the following Detailed Description, which together serve to explain certain principles of the present invention.

It should be understood that the appended drawings are not necessarily to scale, presenting a somewhat simplified representation of various features illustrative of the basic principles of the invention. Certain design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

The present invention focuses on a point that a parting line between a roof panel and a moving glass of a panoramic sunroof extends without a straight line section by allowing the moving glass to be movable along a curved path of a rear rail.

For this, in order to allow the parting line between the moving glass 10 and the roof panel 60 to become a curved line as shown in the right drawing of FIG. 8, the rail 20 that is a linear transfer path of the moving glass 10 may be adopted as a curved path, and may be mounted inside the roof panel 60.

Here, as shown in FIGS. 1 through 5, a fixing bracket 30 may be disposed at the side surface of the rear end of the moving glass 10. The fixing bracket 30 may tilt or linearly move. Also, a moving bracket 40 may be disposed to move along the trajectory of the curved path of the rail 20.

The fixing bracket 30 may be disposed at the side surface of the rear end of the moving glass 10 constituting the panoramic sunroof using a hinge, and may be rotated at a certain angle by a tilting unit to allow the moving glass 10 to tilt. A rail slider 54 disposed at the rear end portion of the moving bracket 40 may be movably coupled to the curved path of the curved rail 20.

According to various embodiments, a slide structure 50 may be disposed between the outer side surface of the fixing bracket 30 and the inner side surface of the front end portion of the moving bracket 40 to enable curved movement by allowing the moving bracket 40 to spread from the fixing bracket 30 when the fixing bracket 30 moves in a straight line.

A portion of the slide structure 50 may be disposed on the fixing bracket 30, and the other portion of the slider structure 50 may be disposed on the moving bracket 40.

A fixing frame 32 may be integrally disposed as a part of the slide structure 50 disposed in the fixing bracket 30. The fixing frame 32 may have a rectangular flame shape on the outer side surface of the fixing bracket 30.

Also, a slider 34 may be movably disposed inside the fixing frame 32 along the width direction of the vehicle body. The slider 34 may have an insertion aperture 33 that vertically penetrates the central portion of the slider 34.

In this case, a first spring 36 may be compressibly connected between the inner side surface of the slider 34 and one inner surface of the fixing frame 32, and a second spring 38 may be compressibly connected between the outer side surface of the slider 34 and the other inner surface of the fixing frame 32

As a part of the slider structure 50 disposed in the moving bracket 40, an insertion member 42 having an insertion aperture therein may be integrally disposed on the inner side surface of the moving bracket 40. One will appreciate that the insertion member and moving bracket may be monolithically formed. A guide rod 44 may be disposed in the insertion member 42 such that the upper and lower ends of the guide rod 44 can rotate on a hinge.

Accordingly, the fixing frame 32 of the fixing bracket 30 and the slider 34 disposed therein may be inserted into the insertion member 42 of the moving bracket 40 such that the guide rod 44 is inserted into the insertion aperture 33 of the slider 34. Thus, the slider 34 may be restrained by the guide rod 44 so as not to be removed from the insertion member 42.

Figure 1:
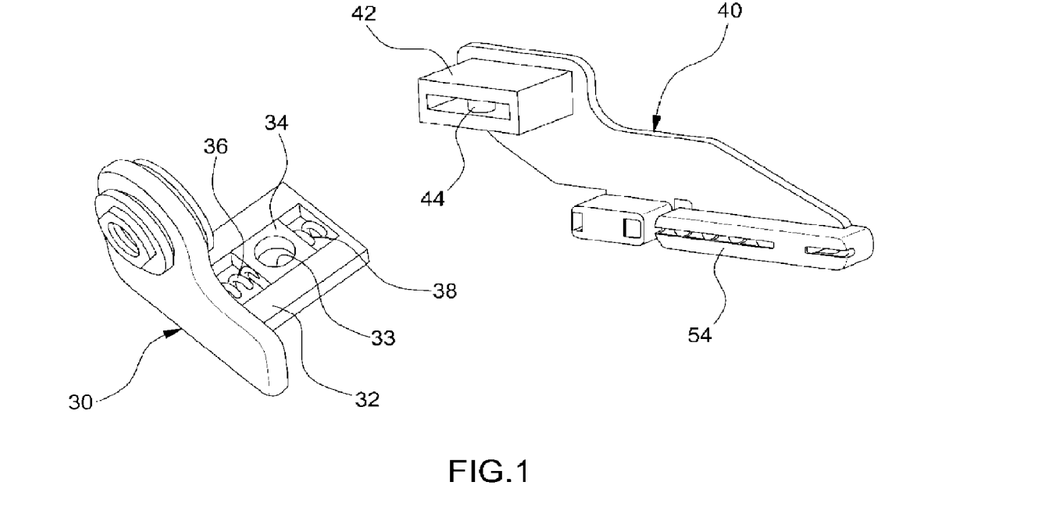
FIG. 1 is a perspective view illustrating an exemplary apparatus for adjusting a parting line of a panoramic sunroof according to the present invention.
Figure 2:
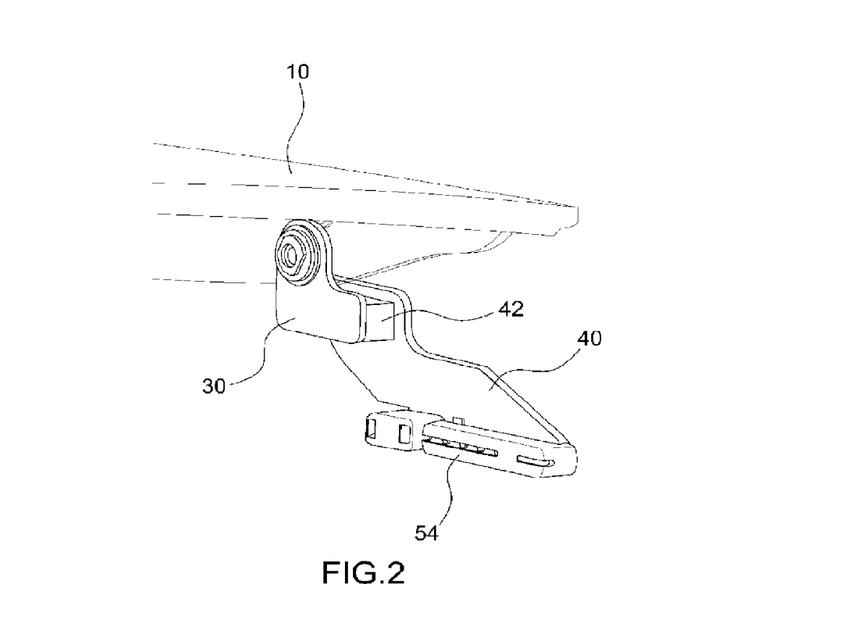
FIG. 2 is an assembled perspective view illustrating an exemplary apparatus for adjusting a parting line of a panoramic sunroof according to the present invention.
Figure 3:
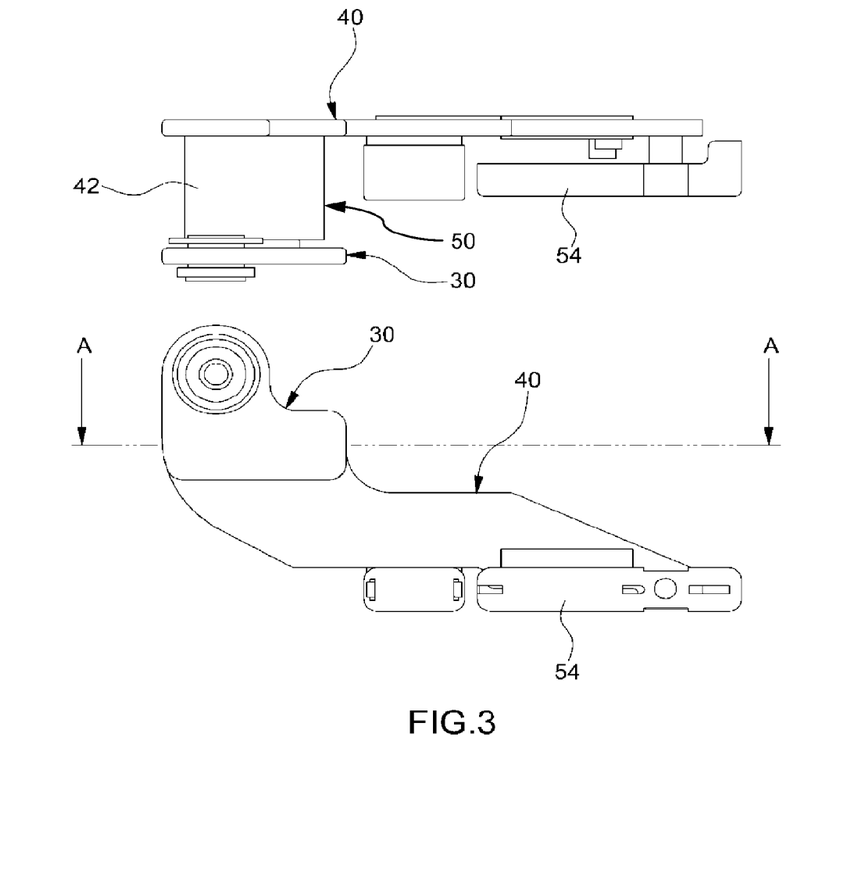
FIG. 3 is a plan view and a side view illustrating an exemplary apparatus for adjusting a parting line of a panoramic sunroof according to the present invention.
Figure 4:
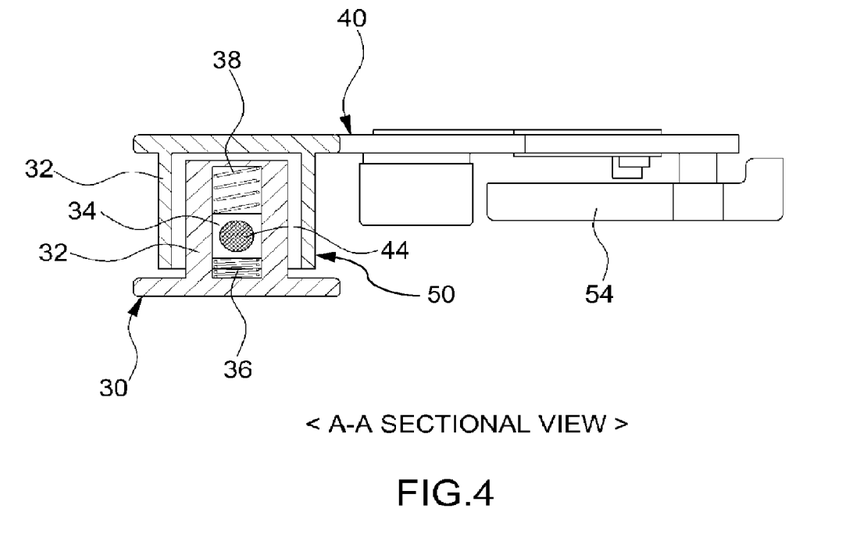
FIG. 4 is a cross-sectional view taken along line A-A of FIG. 3.
Figure 5:
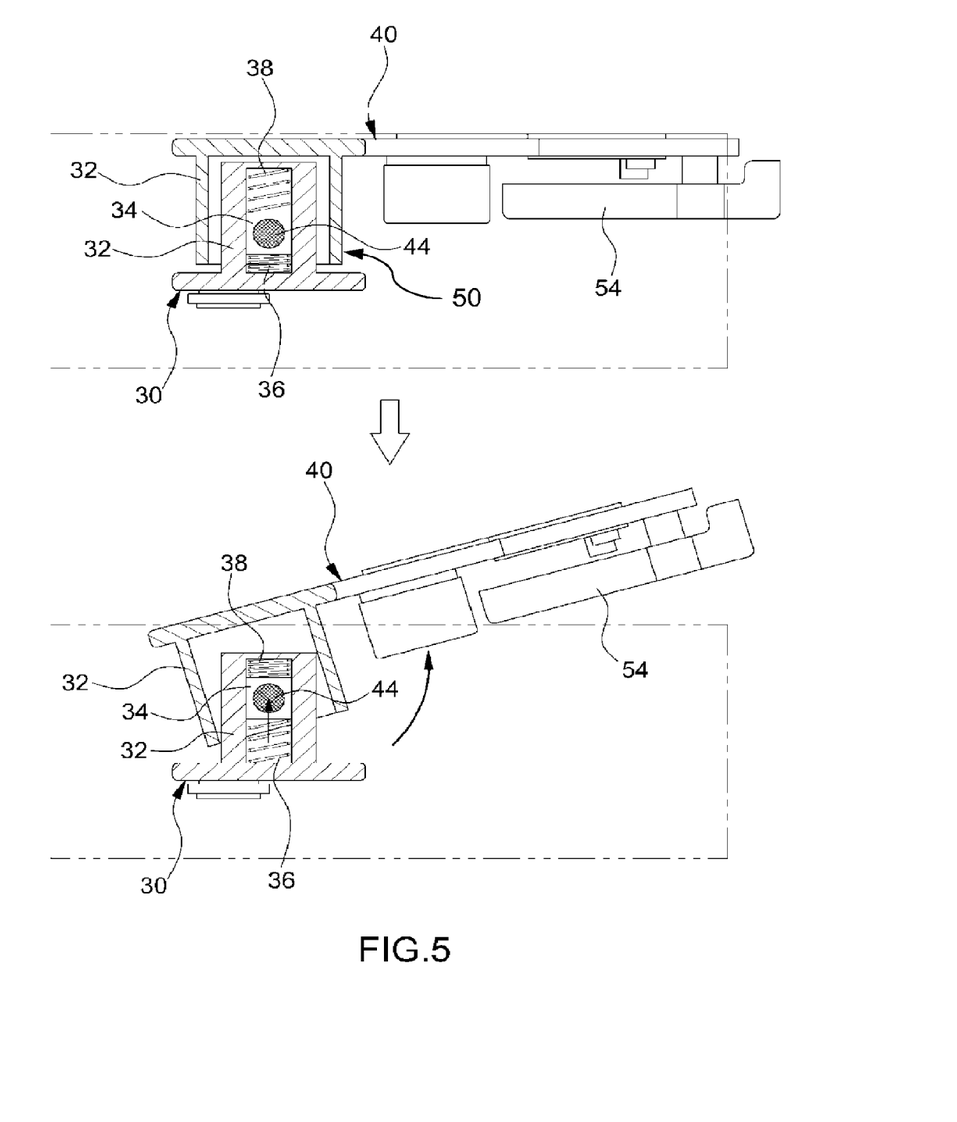
FIG. 5 is a cross-sectional view illustrating an operational flow of an exemplary apparatus for adjusting a parting line of a panoramic sunroof according to the present invention.
Figure 6:
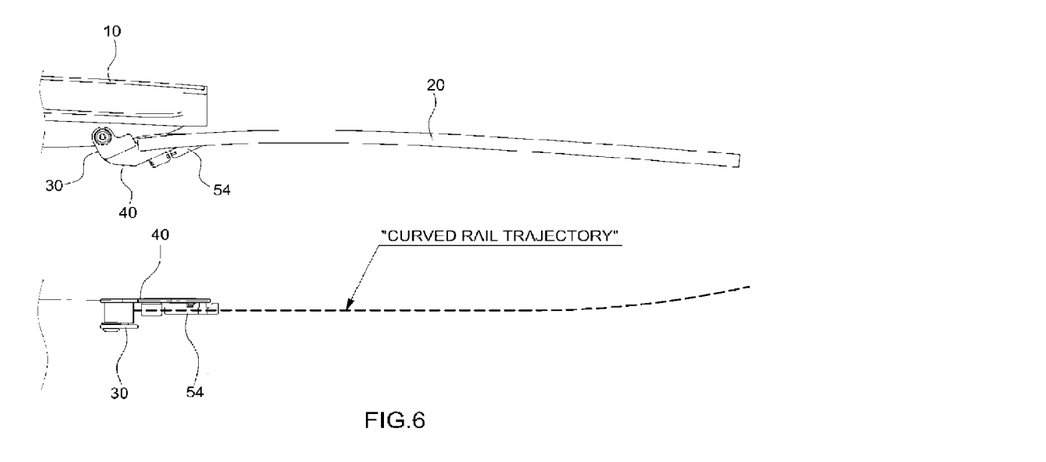
FIGS. 6 and 7 are side views and plan views illustrating an exemplary apparatus for adjusting a parting line of a panoramic sunroof, moving along a curved rail trajectory, which show the closed and opened states of a moving glass.
Figure 7:
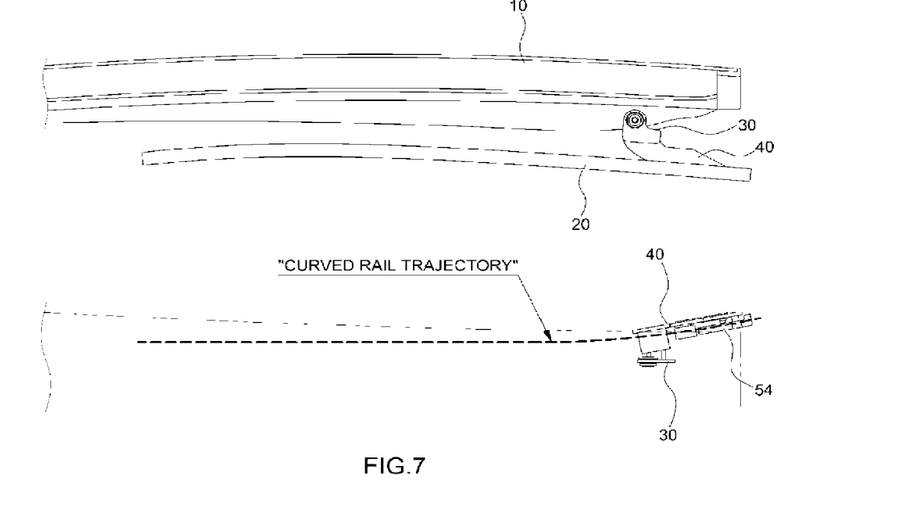

Hereinafter, the operation state of an apparatus for adjusting a paring line of a panoramic sunroof according to various embodiments of the present invention will be described with reference to FIGS. 5 through 7.

When the moving glass 10 is switched from the opened position to the closed position, the fixing bracket 30 is tilted by the tilting unit, lifting the moving glass 10 upwardly.

Consecutively, when a motor driving unit for moving the moving glass 10 in the direction of the opened position (backward direction) operates, the fixing bracket 30 and the moving bracket 40 connected thereto via the slide structure 50 may move backward along the rail 20.

In this case, since the rail 20 is a curved rail, when the fixing bracket 30 moves in a straight line, the moving bracket 40 may easily move backward along the curved rail 20 due to spreading of the slide structure 50.

More specifically, the fixing bracket 30 may move in a straight line, and simultaneously the rail slider 54 of the moving bracket 40 may pivot around the front end portion of the moving bracket 40, moving along the curved rail 20. In this case, the guide rod 44 inserted into the slider 34 of the slide structure 50 may be outwardly released, and the slider 34 may be pulled toward the moving bracket 40.

Also, when the slider 34 moves toward the moving bracket 40, the first spring 36 may be extended, and simultaneously, the second spring 38 may be compressed.

Thus, since the slider 34 moves toward the moving bracket 40, the front end portion of the moving bracket 40 and the rear end portion thereof, i.e., the rail slider 54 may be transferred backward along the curved trajectory path of the curved rail 20.

Since upon the open movement of the moving glass 10, the moving bracket 40 spreads by a certain angle of the curved path of the rail 20 from the fixing bracket 30, the rail slider 54 of the moving bracket 40 may be easily transferred forward or backward along the curved trajectory path of the curved rail 20, enabling smooth open/close operation of the moving glass 10.

Thus, since the glass parting line between the moving glass 10 and the roof panel 60 can be improved into one curved line that extends without a straight line section, the design flexibility on the glass parting line and the exterior merchantability can be improved.

The present invention has the following effects.

An apparatus for adjusting a paring line of a panoramic sunroof according to various embodiments of the present invention can increase the design flexibility on the glass parting line and thus improve the exterior merchantability because a glass parting line between a moving glass of the panoramic sunroof and a roof panel can be improved into one curved line without a straight line section, by forming a structure that can move along a curvature trajectory of a rear rail at a tilt lever connected between the moving glass and the rear rail and allowing the tilt lever of the moving glass to move along the curvature trajectory of the rail.

For convenience in explanation and accurate definition in the appended claims, the terms upper or lower, front or rear, and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An apparatus for adjusting a parting line of a panoramic sunroof comprising:
    a moving glass;
    a rail;
    a fixing bracket disposed on a side surface of a rear end of the moving glass tiltable and movable in a straight line;
    a moving bracket disposed on a curved path of the rail and movable along a curved trajectory; and
    a slide structure connected between the fixing bracket and the moving bracket to effect curved movement by allowing the moving bracket to spread from the fixing bracket when the fixing bracket moves in a straight line;
    wherein the slide structure comprises:
        a fixing frame integrally formed on an outer surface of the fixing bracket;
        a slider disposed inside the fixing frame to be movable along a width direction of a vehicle body and having an insertion aperture at a center thereof;
        a first spring connected between an inner side surface of the slider and one inner surface of the fixing frame and a second spring connected between an outer side surface of the slider and the other inner surface of the fixing frame;
        an insertion member formed on an inner side surface of the moving bracket; and
        a guide rod integrally connected to upper and lower surfaces inside the insertion member;
    wherein the fixing frame is inserted into the insertion member of the moving bracket together with the slider, and simultaneously, the guide rod is inserted into the insertion aperture of the slider.

2. The apparatus of claim 1, wherein upon open movement of the moving glass, the moving bracket spreads from the fixing bracket by an angle of the curved path of the rail.

3. The apparatus of claim 1, wherein upper and lower ends of the guide rod are rotatably disposed on the upper and lower surfaces, respectively.

* * * * *